March 19, 1963 J. DOYEN 3,082,278
METHOD AND APPARATUS FOR MAKING BATTERY ELECTRODES
Filed Dec. 8, 1959 2 Sheets-Sheet 1

INVENTOR:
JEAN DOYEN
BY
AGENT

March 19, 1963 J. DOYEN 3,082,278
METHOD AND APPARATUS FOR MAKING BATTERY ELECTRODES
Filed Dec. 8, 1959 2 Sheets-Sheet 2

INVENTOR:
JEAN DOYEN
BY
AGENT Karl F. Ross

United States Patent Office 3,082,278
Patented Mar. 19, 1963

3,082,278
A METHOD AND APPARATUS FOR MAKING BATTERY ELECTRODES
Jean Doyen, Paris, France, assignor to Yardney International Corp., New York, N.Y., a corporation of New York
Filed Dec. 8, 1959, Ser. No. 858,167
Claims priority, application France Dec. 8, 1958
15 Claims. (Cl. 136—30)

The present invention relates to electrodes for primary or secondary electrical batteries, particularly (but not exclusively) batteries operating with an alkaline electrolyte, and to a process for making such electrodes.

Electrodes whose active material is soluble in the electrolyte, such as the negative plates of silver-zinc batteries or the like, usually require the provision of a framework supporting the comminuted active mass in order to prevent major deformation of the electrode body during cycling. It is an object of the present invention to provide an improved, more expeditious and simpler commercial process for mass-producing composite electrodes of the type referred to.

Another object of the invention is to provide an electrode, adapted to be produced by the process mentioned, in which the comminuted active material is firmly retained by a conductive framework affording adequate access to the electrolyte.

In accordance with an important feature of this invention, the comminuted active electrode material is introduced between two perforated foils of a sheet metal which preferably is the same as the metal constituting the base of the active material. After the edges of the foils have been sealed to prevent a lateral extrusion of the enclosed mass, the entire package is compressed and preferably embossed for more effective interlocking of the perforated foils with the core of the compacted powder.

Advantageously, in accordance with another feature of the invention, the initial perforation of the foils is carried out by a punching process which leaves them with inwardly directed projections penetrating the active mass, thus insuring still more intimate contact between this mass and its metallic envelope. In this manner there may be formed a compacted, elongated electrode strip from which individual plates may then be cut as required.

The sealing of the edges can be accomplished, in accordance with a further feature of the invention, by a continuous operation in which these edges are first bent over and then compressed. Advantageously, two or more parallel foils are interlinked by these inturned edges and are then simultaneously compressed so that the entire composite sheet is flattened while its external and internal edges are sealed.

It will be convenient to provide the perforated foils in the form of elongated webs so that the finished composite will be a long strip or band. The open transverse edges of an electrode plate cut from a strip so produced can be closed with the aid of thin strips of solid metal folded and compressed therearound. One of these latter strips may be extended beyond the electrode body to form a terminal lead.

The invention will be described in greater detail with reference to the accompanying drawing in which.

Figure 1:
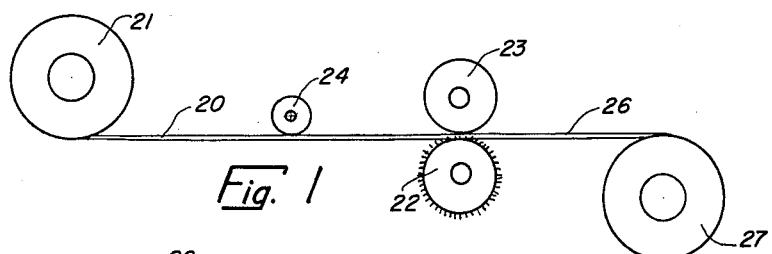
FIG. 1 is a somewhat diagrammatic side-elevational view of an apparatus for carrying out an initial step in the process of this invention.
Figure 3:
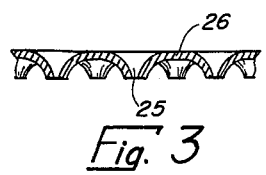
FIG. 3 is a fragmentary sectional view, drawn to a larger scale, on the line III—III of FIG. 2.
Figure 2:
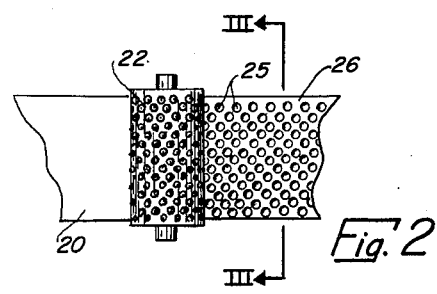
FIG. 2 is a partial bottom view of a perforated web as produced by the apparatus of FIG. 1.

In FIG. 1 there is shown an elongated web consisting, for example, of laminated zinc, e.g. of a thickness of 0.1 mm., which is drawn from a supply roll 21 and, after passing underneath a guide roller 24 and a pair of feed rollers 22, 23 is wound upon take-up roll 27. Lower feed roller 22 is provided with teeth for punching holes 25 into the web 20, these webs preferably having a small diameter (e.g. from 0.1 to 0.2 mm.) and a similarly small relative spacing. As best seen in FIG. 3, the punching process produces on one surface of the so perforated web 26 a series of protuberances which surround the holes 25.

Figure 6:
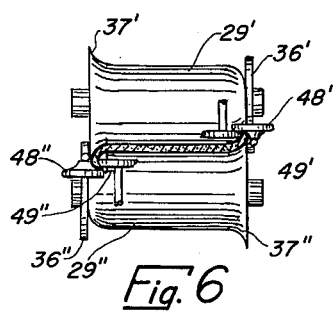
FIG. 6 is an end view taken on the line VI—VI of FIG. 5.
Figure 5:
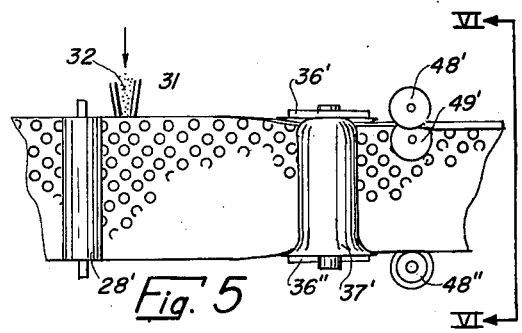
FIG. 5 is a fragmentary top view of the assembly of FIG. 4.
Figure 4:
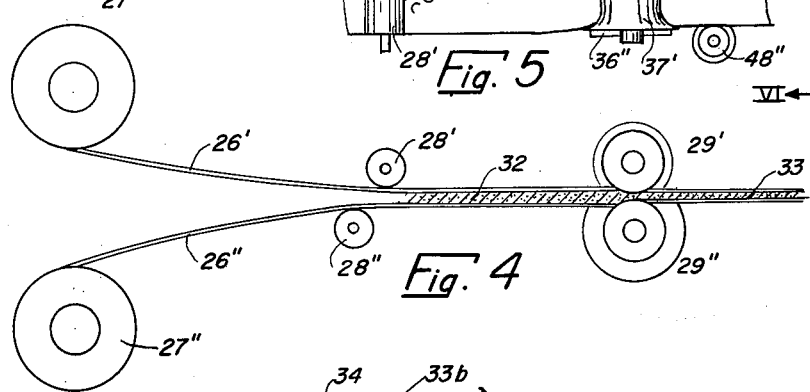
FIG. 4 is a diagrammatic side-elevational view of an apparatus for producing an electrode strip from two webs as obtained in the process of FIGS. 1–3.
Figure 8:
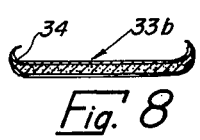
FIGS. 7 and 8 are cross-sectional views of two composite strips adapted to be produced by an apparatus of the general type shown in FIGS. 4 and 6.
Figure 7:
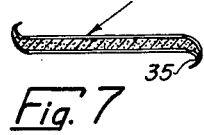
Figure 9:
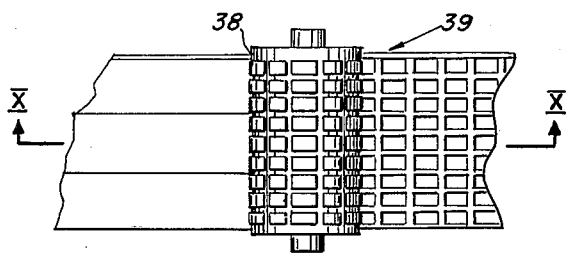
FIG. 9 is a top view of an embossing mechanism used in the further processing of the strip obtained from the apparatus of FIGS. 4 to 6.
Figure 10:
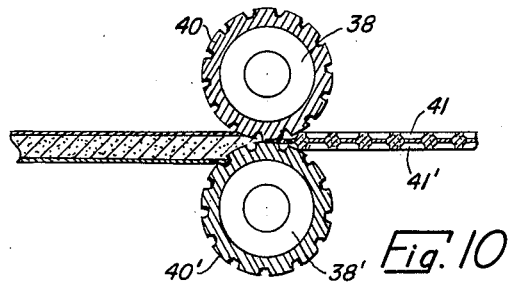
FIG. 10 is a sectional view taken on the line X—X of FIG. 9.
Figure 14:
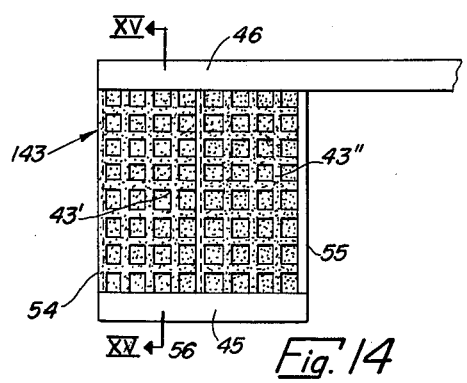
FIG. 14 is a plan view of an electrode cut from a multiple strip of the type shown in FIG. 13.
Figure 11:
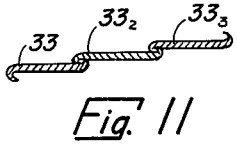
FIG. 11 is a cross-sectional view of a multiple strip composed of several individual strips of the type shown in FIG. 8.
Figure 12:
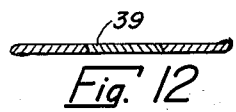
FIG. 12 is a cross-sectional view of the multiple strip of 11 after further compaction.

Next, two perforated webs 26', 26", respectively taken from storage rollers 27' and 27", are fed between guide rollers 28', 28" and pressure rollers 29', 29" with the simultaneous introduction of powdered active material 32, such as zinc or a zinc compound (e.g. zinc oxide), therebetween whereby a composite sheet 33 is formed in which the powder is sandwiched between the layers 26' and 26". The powder 32, which may be for example of 80-mesh particle size, is advantageously injected from either or both sides by suitable means such as a feeding trough 31. In order to seal the edges of the composite strip 33, the rollers 29' and 29" are advantageously provided with matting flanges 36', 37' and 36" and 37" between which the aligned upper and lower edges of 26' and 26" are turned up or down as best seen in FIG. 6. Additional rollers 48', 48" and 49', 49" serve to complete the inturning of the edges so as to form a strip 33a of generally S-shaped cross section as shown in FIG. 7 or, if the feed rollers 48" and 49" were positioned above the working surface in the same way as rollers 48" and 49", a strip 33b of C-shape cross section as shown in FIG. 8. Several such strips may be interlinked by their inturned edges, as illustrated at 33, 33₂, 33₃ in FIG. 11, whereupon the entire unit may be compacted between rollers 38' and 38" to form a flattened multiple band 39 (see also FIG. 12) having regularly spaced surface indentations 41', 41' produced by the teeth 40', 40" of the rollers 38' and 38".

Figure 13:
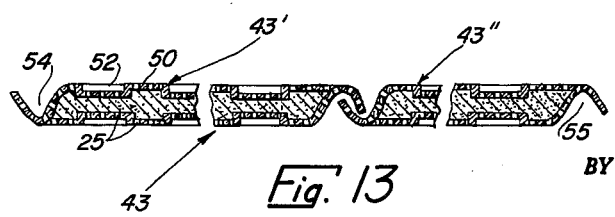
FIG. 13 is a cross-sectional view, drawn to a larger scale, of a multiple strip similar to that of FIG. 11, shown before compaction.

As illustrated in FIG. 13, the multiple band may also be formed from individual strips 43', 43" whose edges 54, 55 are trough-shaped rather than turned inwardly as previously described. After embossing, the holes 25 are still visible along with their indentations 52 separated by projections 50.

Figure 15:
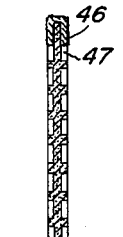
FIG. 15 is a cross-sectional view taken on line XV—XV of FIG. 14.

From the compacted multiple band 39 or 43 thus produced, electrode plates 143 may be obtained by cutting in a direction transverse to the edges 54, 55 and the intermediate junction line 56. The transverse edges resulting from this cutting operation are enveloped in strips 45 and 46 which are bent into U-shaped cross section as best seen in FIG. 15, the upper strip 46 being shown extended to serve as a terminal lead. These strips may be fastened to the electrode body by swaging, soldering or the like.

An electrode of this character can be made with an overall thickness of approximately 1 to 1.5 mm., where the active material is zinc, the end-enveloping strips 45, 46 may be made of thin copper or brass foil, e.g. of a thickness of 0.02 to 0.05 mm.

This invention is also applicable to electrodes made from sinterable material such as silver. In this case the powder 32 injected at trough 31 may be coarsely comminuted silver (e.g. of 80-mesh particle size) while the webs 20 may be constituted of thin silver foil, e.g. 0.02 mm. thick. In such event the compacted powder between the sheets may have a density between 4 and 4.3. The negative electrode plate so constituted is advantageously sintered, e.g., at a temperature of 725° C. for a period of six minutes.

I claim:

1. A continuous process for making battery electrode material which comprises continuously feeding a pair of elongated perforated webs of metal in spaced face-to-face relationship along a predetermined path of travel, continuously introducing particulate electrochemically active material between said webs, whereby a sandwich structure having lateral sides is formed comprising an upper and lower layer of web material and an intermediate layer of particulate electrochemically active material, sealing said upper and lower layer together along said lateral sides and pressing said sandwich structure whereby said battery electrode material is shaped.

2. A process according to claim 1 including the step of compacting said sealed sandwich structure under relatively high pressure to form a compact strip of battery electrode material.

3. A process according to claim 2 wherein said upper and lower layers are sealed along said lateral sides by folding over the edges of said upper and lower layers.

4. A process according to claim 2 wherein said perforated metal web is zinc and said particulate material is selected from the group consisting of zinc powder and zinc oxide powder.

5. A process according to claim 2 wherein said sealing of said upper and lower layer precedes said pressing of said sandwich structure.

6. A process according to claim 2 including the further step of continuously cutting sections of said electrode material transversely into sections of suitable sizes to serve as electrode plates.

7. A process according to claim 2 including the further step of sintering the compacted electrode material.

8. A process according to claim 7 wherein the particulate electrochemically active material is silver.

9. A process according to claim 2 wherein said sealing of said upper and lower layer and the pressing of said sandwich structure is effected simultaneously.

10. A process according to claim 2 wherein said battery electrode material is embossed during the compacting operation.

11. A process according to claim 1 including the further step of interlinking a plurality of said pressed sandwich structures at their folded edges to form a multiple band and further compacting said multiple band.

12. A continuous process for making battery electrodes which comprises continuously feeding a pair of elongated perforated webs of zinc in spaced face-to-face relationship along a predetermined path of travel, said webs having depending tabs extending from said perforations toward the other web, continuously introducing between said webs a powdered material containing as the principal electrochemically active material a powdered zinc material selected from the group consisting of zinc powder and zinc oxide powder whereby a sandwich structure is formed having lateral sides and comprising upper and lower layers of perforated zinc web material and an intermediate layer of said powdered zinc material, simultaneously pressing said sandwich structure and folding the lateral edges of said zinc webs inwardly to seal said powdered zinc between said zinc webs, simultaneously compacting and embossing said pressed sandwich structure to form electrode material and cutting said electrode material into sections of suitable sizes to serve as electrode plates.

13. An assembly useful for the manufacture of battery electrode materials comprising, means for continuously feeding a pair of perforated webs of metal in spaced face-to-face relationship along a predetermined path of travel, means downstream of said feeding means for continuously depositing electromechanically active particulate material between said metal webs, means downstream of said particulate depositing means for sealing the edges of said metal web and for pressing the metal webs and particulate material together, and means downstream of said sealing means for compacting said electrode material at relatively high pressures.

14. An assembly according to claim 13 wherein said sealing means and said pressing means are adopted to simultaneously seal the edges of said metal webs together and to press said metal webs together and to press said metal webs and particulate material together.

15. An assembly according to claim 14 wherein said sealing and pressing means comprising a pair of rollers designed to fold over the edges of said web materials.

References Cited in the file of this patent

UNITED STATES PATENTS

| | | |
|---|---|---|
| 509,270 | Usher | Nov. 21, 1893 |
| 976,824 | Morrison | Nov. 22, 1910 |
| 1,752,963 | Pettinelli | Apr. 1, 1930 |
| 2,277,763 | Keen | Mar. 31, 1942 |
| 2,844,641 | Long | July 22, 1958 |
| 2,845,470 | Haskell et al. | July 29, 1958 |

FOREIGN PATENTS

| | | |
|---|---|---|
| 737,290 | Great Britain | Sept. 21, 1955 |